April 16, 1968 D. J. CAUGHLEY 3,378,091
FOUR-TUBE HYDRAULIC SCALE WITH ZEROING FEATURE
Filed Dec. 6, 1965 4 Sheets-Sheet 1
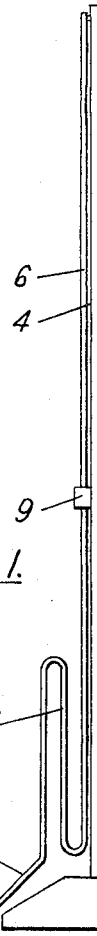
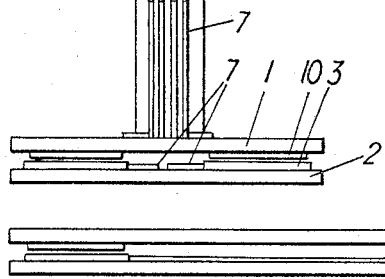
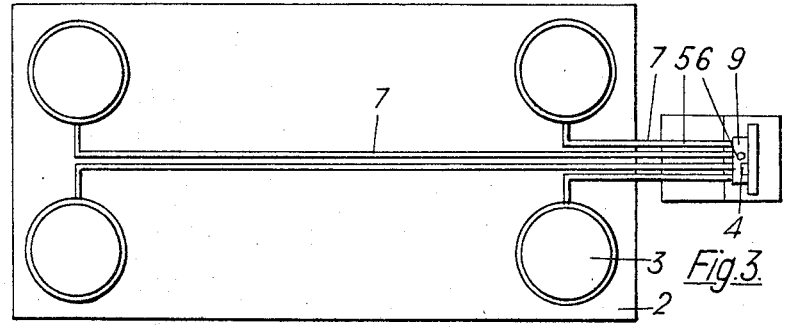

April 16, 1968  D. J. CAUGHLEY  3,378,091
FOUR-TUBE HYDRAULIC SCALE WITH ZEROING FEATURE
Filed Dec. 6, 1965

April 16, 1968   D. J. CAUGHLEY   3,378,091
FOUR-TUBE HYDRAULIC SCALE WITH ZEROING FEATURE
Filed Dec. 6, 1965   4 Sheets-Sheet 4
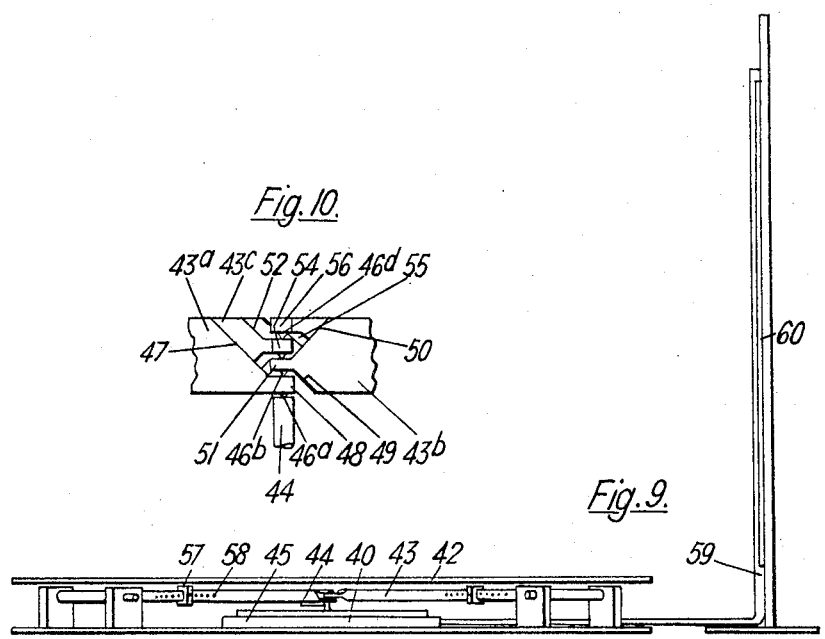
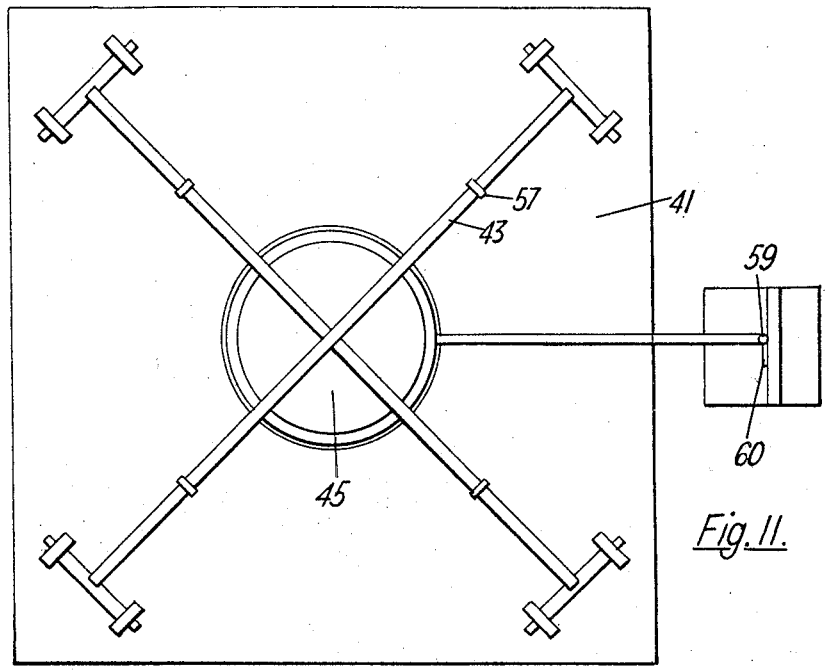

United States Patent Office 3,378,091
Patented Apr. 16, 1968

3,378,091
FOUR-TUBE HYDRAULIC SCALE
WITH ZEROING FEATURE
David J. Caughley, Masterton, North Island, New Zealand, assignor to Donald Presses Limited, Masterton, North Island, New Zealand, a company of New Zealand
Filed Dec. 6, 1965, Ser. No. 511,815
Claims priority, application New Zealand, Dec. 9, 1964, 140,236
8 Claims. (Cl. 177—209)

The present invention relates to weighing machines, in particular to hydraulic weighing machines, in which the load of the article to be weighed exerts pressure on fluid contained in one or more pressure generators beneath the article, the pressure generators each being connected to a recording device by way of a column of liquid whereby the load is indicated on the recording device.

An object of the invention is to provide an improved weighing device, which is of simple construction and therefore relatively cheap to manufacture.

Accordingly, the present invention provides a weighing device comprising a weighing platform, one or more deformable pressure generating fluid containers of flexible material positioned beneath the platform and a column of liquid connecting the container or containers to a recording device, whereby the weight of the platform and article or articles placed thereon is indicated on said recording device.

According to one arrangement of the present invention, a plurality of deformable pressure generating fluid containers of flexible material are positioned beneath the platform, the platform resting thereon, each container being connected to the recording device, preferably a calibrated liquid containing vertical tube, by a separate column of liquid and an adjusting valve.

According to yet another arrangement of the present invention, a plurality of deformable pressure generating fluid containers of flexible material are positioned beneath the platform, the platform resting thereon each container being connected to a pressure recording device preferably a calibrated manometer tube by a separate column of liquid and a pressure reducing valve.

In order that the invention may be more readily understood, preferred embodiments thereof are described below in conjunction with the accompanying drawings, in which:

FIGURE 1 shows a side view of one embodiment of the weighing machine according to the present invention;

FIG. 2 shows a side view of the weighing machine of FIGURE 1, the side view being at right angles to the view shown in FIGURE 1;

FIGURE 3 is a plan view of the weighing machine of FIGURES 1 and 2 with the weighing platform removed;

Figure 4:
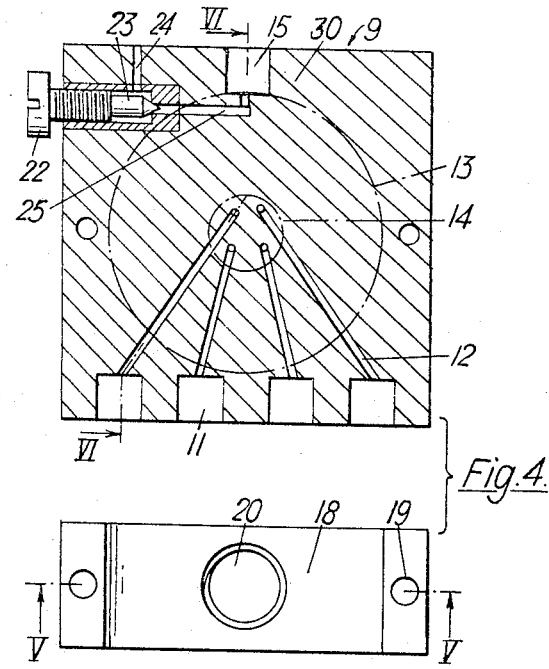
FIGURE 4 shows an exploded sectional view of some of the components of an adjusting and shut-off valve forming part of the weighing machine of FIGURES 1–3.
Figure 5:
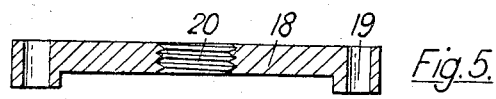
Figure 6:
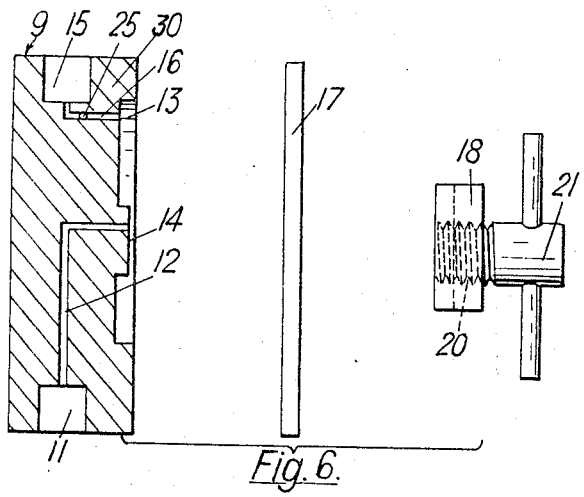
Figure 7:
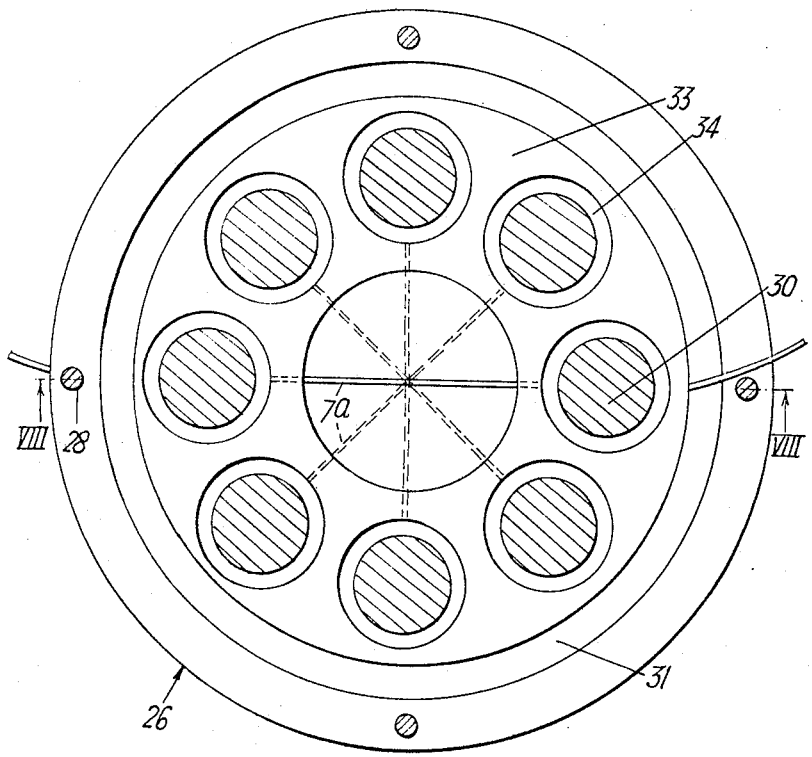
Figure 8:
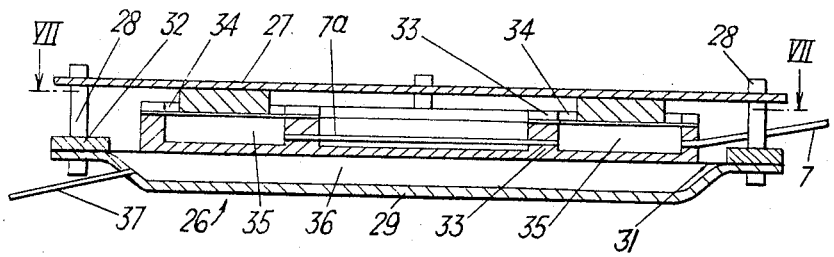

FIGURE 5 indicates a sectional view along the line V—V through the adjusting screw plate forming part of the adjusting screw plate of the adjusting and shut-off valve of FIGURE 4;

FIGURE 6 shows an exploded view in section along the line VI—VI of the components of the adjusting and shut-off valve of FIGURE 4;

FIGURE 7 is a plan view of a pressure reducing valve for use in the weighing machine of FIGURES 1–3 with the top plate removed;

FIGURE 8 is a sectional view of the valve of FIGURE 7 along the line VIII—VIII;

FIGURE 9 is the side view of a second embodiment of the weighing machine according to the present invention;

FIGURE 10 is a detail of the abutment forming part of the weighing machine of FIGURE 9; and FIGURE 11 is a plan view of the weighing machine according to FIGURES 9 and 10 with the weighing platform removed.

As shown in FIGURES 1, 2 and 3, the weighing machine includes a plane weighing platform 1, resting on a base 2 by the intermediary of four deformable pressure generating containers 3 made of flexible material, positioned between the platform 1 and the base 2. The platform 1 is shown as rectangular in shape having one of the four pressure generating containers 3 provided at each corner thereof, but the shape of the plate may vary as desired, with the pressure generating containers being distributed evenly therebeneath. Each pressure generating container 3 being of flexible material is also completely air-tight and closed apart from its connection leading therefrom to a connecting tube 7, and each container has an associated connecting tube 7. Fluid, preferably liquid, is provided in each container and also in the connecting tubes 7. It is preferable that plates 10 preferably of substantially the same peripheral extent as the containers 3 be positioned on the under surface of the platform 1 to provide a more even contact between the platform and the containers 3. A plate 10 is provided for each container 3.

The tubes 7 extend between base 2 and platform 1, in the space provided therebetween, by reason of the intervention of the containers 3 and plates 10, if such plates are provided, and they preferably lie substantially horizontally between the base 2 and platform 1 and extend beyond the base 2 and platform 1, where they rise into a vertical position. The tubes 7, being four in number, since they extend from four deformable containers 3, each extend into one of four U-tubes 5, with the upper ends of each U-tube 5 passing into an adjusting and shut-off valve 9. The fluid, as mentioned above preferably liquid, in the tubes 7 extends into the U-tubes 5 which are filled with mercury for most of their length, and further liquid is provided in the uppermost part of the limb of the U tube connected to the valve 9.

The adjusting and shut-off valve 9 is indicated in more detail in FIGURES 4, 5 and 6. The valve 9 comprises a solid block member 30, which may be of translucent or transparent material if desired and which has provided therein, such as by drilling, inlets 11 which are each for attachment to one of the four upper limbs of the U-tubes 5. Leading from each inlet 11 into the interior of the block member 30 is a bore 12. The bores 12 are each provided with a continuation extending substantially at right angles therefrom for connection to one outer surface of the block 10 which is provided with profiled depression 13, 14 therein. These depressions 13, 14 preferably comprise an outer annular depression 13 encircling a circular depression 14 of smaller depth than the annular depression 13 within the block member 30. When positioned in the weighing machine of the present invention the block member 30 forming part of the adjusting and shut-off valve 9 is mounted substantially vertically with the inlets 11 for the U-tubes 5 in the lower surface of the block member 30 and with a single outlet 15 positioned vertically above the four inlets 11 and provided in the upper surface of the block member 30. The depressions 13, 14, in the block member 30 are positioned in a vertical face thereof. The upper outlet 15 in the block member 30 is connected to the upper part of the annular depression 13 by a bore 16 passing through the block member 30. A flat diaphragm 17 substantially co-extensive at least vertically with the dimensions of said vertical face of the block member 30 containing the depressions 13 and 14 is positioned in surface contact with said vertical face of the block member 30 and is held in position by a plate 18 which is fixedly attached to the block member 30 such as by screw means at 19. The diaphragm 17 extends laterally at least over the entire extent of the depressions 13 and 14. The plate 18 is provided at its center with a bore 20 through which an adjusting and shut-off screw 21 may pass, and the bore 20 is screw threaded.

Extending into another surface of the block member 30 is a bleed screw 22 extending into a passage 23 which is connected by a bore 24 to the atmosphere and a bore 25 to the bore 16.

Thus, with the valve 9 in position, the U-tubes 5 are connected to a vertical tube 6 and a calibrated scale 4 is provided adjacent said tube 6. The liquid in the U-tubes 5 positioned on the valve side of the mercury therein extends from its position at the upper part of the U-tubes 5 into the inlets 11 through the bores 12, into the depressions 13 and 14 and out through bore 16 and outlet 15 to the single vertical tube 6 connected within outlet 15. The inner end of the screw 21 engages on the outer surface of the diaphragm 17 and the inner surface of the diaphragm lies flush with said vertical surface of the block member 30 having the depressions 13, 14 therein, to form a chamber between the inner surface of the diaphragm and the inner surfaces of the depressions 13 and 14 in the block member 30. In order to vary the volume of this chamber it is merely necessary to rotate the adjusting screw 21 within the bore 20 of the plate 18 whereby the center of the diaphragm 17 moves inwardly within the chamber causing the diaphragm 17 to flex convexly relative to the inner surface of the depressions 13 and 14 such as to decrease the volume of said chamber.

Before the weighing machine is to be used it is necessary to ensure that the liquid in the vertical tube 6 above the valve 9 rests adjacent the zero position on the scale 4. To effect this it is merely necessary to adjust the screw 21 within the bore 20 of plate 18 to cause the diaphragm 17 to flex inwardly as described above until the liquid in the chamber formed by the diaphragm and the depressions 13 and 14 is of such capacity as to extend up through the bore 16 into outlet 15 and have its upper level coinciding with the zero mark on the scale 4 adjacent the vertical tube 6. The diaphragm 17 is left in this position during subsequent use of the weighing machine. If it is found that there is excess liquid in the vertical tube 6 causing the liquid to lie above the zero mark on the scale 4 with the diaphragm 17 flexed inwardly as far as possible without closing of the outlets of bores 12 into depression 14, it is then necessary to rotate the bleed screw 22 within the passage 23 to open the outlet of the bore 25 in which the tip of the bleed screw 22 engages. Upon opening of the bore 25, connection between the bore 25 and bore 24 is effected to allow bleeding off of the liquid to atmosphere via the bores 24, 25. The bleed screw is controlled to allow this bleeding off until the liquid in the vertical tube 6 drops to coincide with the zero mark on the scale 4.

When a weight is subsequently placed on the platform 1, pressure is generated there below in the containers 3 which are thus deformed, forcing the liquid in their associated connecting tube 7 to rise in the vertical part thereof and into the separate U-tubes 5 which are partially filled with mercury, the mercury is thus displaced proportionately and likewise the liquid in the upper limb of the U-tubes 5, with said liquid likewise moving up towards the valve 9 and causing an increase in the level of the liquid which was originally at the zero on the calibrated scale 4. The vertical tube 6 is filled with liquid and the scale 4 is provided along its length in graduated weight value such as pounds, kilograms, etc. As soon as the article is withdrawn from the weighing platform 1, the pressure generating containers 3 are no longer deformed and the liquid in the connecting tubes 7, U-tubes 5 and vertical tube 6 is allowed to fall.

As the liquid on the side of the U-tubes 5 connected to the containers 3 is isolated from that in the vertical tube 6 by the mercury, this liquid cannot flow from the U-tubes 5 to the vertical tube 6 nor from one pressure generating container 3 to another via the valve 9. Furthermore there can be no flow of mercury from one U-tube 5 to any of the others owing to an insufficient pressure from the pressure generating containers, if the machine is not overloaded. In addition, provided the mercury has a greater specific gravity than the liquid, any small change in the level of the common surface between the liquid and the mercury in the U-tubes 5 caused by pressure generated in the pressure generating fluid containers 3 will be magnified proportionately as a greater change in level of liquid in the tube 6. This facilitates the use of smaller pressure generating containers 3 and tubes 7 than in known arrangements.

If it is desired to transport the weighing machine, it is merely necessary to adjust the screw 21 further to flex the center of the diaphragm 17 against the inner surface of the lower depression 14 and thus completely cut-off the outlet of bores 12 to the chamber formed by the depressions. This serves to maintain a constant volume of liquid within the U-tubes 5, connecting tubes 7 and pressure generating containers 3 thus providing a "rigid" system preventing movement of the platform 1 towards the base 2 and giving stability to the weighing machine in transit.

It will be noted that not only can the air bleed valve 22 be used to remove excess liquid but should the liquid in the vertical tube not be sufficient to coincide with the zero mark of the calibrated scale 4, liquid may be fed in through the bores 24 and 25.

As shown in FIGURES 7 and 8 an alternative form of valve is provided in the form of a pressure reducing valve 26. The pressure reducing valve 26 replaces valve 9 and U-tubes 5 and comprises housing formed by a plate 27, preferably circular, fixedly attached by spacing members 28 to a base member 29 of the same shaped periphery. The valve 26 is positioned such that the plate 27 and base member 29 are substantially horizontal. The plate 27 which has been removed from FIGURE 7 to indicate the valve more clearly has eight plates 30 attached to its lower surface. Each plate 30 is preferably of circular formation and these plates 30 are disposed on the lower surface of plate 27 in a circle. The plates 30 are indicated in FIGURE 7 to assist in the explanation of the invention.

A diaphragm 31, i.e., preferably a circular diaphragm, is clamped around its outer periphery to the base member 29 by means such as a clamping ring 32 to form two compartments within the housing. A pressure plate 33 rests on the diaphragm 31 centrally thereof in one compartment of the housing, and the pressure plate 33 is likewise preferably circular. The plate 33 is provided with eight diaphragms 34 preferably of circular formation positioned in a circle around the upper surface of the pressure plate 33, with each diaphragm 34 being positioned beneath a circular plate 30 attached to the bottom of plate 27. Each plate 30 is positioned concentric with the diaphragm 34 positioned therebelow. The diaphragms 34 each form a separate chamber 35 thereunder within the pressure plate 33. The tubes 7 from the pressure generating containers 3 are each connected to separate ones of the chambers 35. The diametrically opposite chambers 35 are mutually connected such as by connection tubes 7a so that the pressure of the liquid passing from one connecting tube 7 acts equally on two diametrically opposite chambers 35 and their associated diaphragms 34. Consequently, four pairs of oppositely disposed diaphragms 34 are provided, with each pair being connected to one of the four connecting tubes 7 leading from the pressure generating containers 3 of the weighing machine. Liquid of the same type as provided in the connecting tubes 7 is provided within the chambers 35 beneath the diaphragms 34.

Liquid, such as water is also provided beneath the diaphragm 31 in the chamber 36 forming the other compartment of the housing and provided between said diaphragm 31 and the base 29 of the valve 26. An outlet 37 is provided extending from this chamber 36 to the manometer tube 6.

Consequently, when a weight is positioned on the weighing platform 1 of the weighing machine, pressure is transmitted from the pressure generating containers 3 beneath the weighing platform 1 via tubes 7 to the chambers 35 with the pressure in each of a pair of chambers 35 being equal due to their mutual connection. This pressure of the liquid beneath the diaphragms 34 causes pressure to be transmitted by the diaphragms 34 to the eight plates 30 connected beneath the plate 27, whereby pressure on each of a pair of diametrically opposed plates 30 is equal. The pressure transmitted from the containers 3 to the chambers 35 having been transmitted to plates 30 as described above then causes equal and opposite downward pressure on plate 33 which will transmit this pressure onto diaphragm 31 and the liquid therebelow in chamber 36. This will cause the pressure part of the liquid in chamber 36 to pass through the outlet 37 which is connected to the vertical tube 6.

The use of this pressure reducing valve means 26 in place of the U-tubes 5 and valve 9 of the earlier described arrangement in the weighing machine described ensures the equalizing of the pressures from the four pressure generating containers 3 should a weight be unevenly positioned on the platform 1 of the weighing machine and cause unequal pressures in the generators 3, the different pressures transmitted via the connecting tubes 7 to chambers 35 will be equalized to form one force acting on the liquid in the vertical tube 6 via the components of the valve 26.

FIGURES 9, 10 and 11 indicate an alternative form of weighing machine which does not include therein any adjusting or shut-off valve means nor any pressure reducing valve means. In this arrangement one deformable pressure generating fluid container 40 of flexible material is positioned on a base member 41 in the approximate center thereof. The base member 41 and platform 42 thereabove are both preferably rectangular or of square configuration and positioned substantially parallel to one another. Levers 43 are positioned beneath the platform 42 having their one ends pivotally mounted on the base member 41 beneath a separate corner of the platform 42 with there being four levers altogether. The four levers 43 extend substantially diagonally of the rectangular or square base member 41 and platform 42 there above toward the center thereof, and the inner ends of the lever 43 rest on a common abutment member 44 mounted substantially on the center of the pressure generating container 40.

The pressure generating container 40 is preferably mounted within a housing 45, and the abutment member 44 is positioned on the upper surface of the housing 45 in the center thereof. Each inner end of the lever members 43a, b, c, d, is provided with a fulcrum point 46 on the lower surface thereof and furthermore the inner ends of the levers rest one above the other with their fulcrum points 46a, b, c, d, resting on the lever directly below, and the lowest lever 43a has its fulcrum point 46a resting in the center of the abutment member 44. The shaping of the inner ends of the levers is as follows: (See in particular FIGURE 10).

The lower lever 43a has its upper inner end surface 47 formed inclined to the vertical substantially the whole depth thereof, with the lowermost portion being horizontal and forming a lug 48 extending from the inclined upper surface 47. The fulcrum point 46a of this lever 43a projects from the lower surface of the lug 48. The inner end of the lever 43b lying above the foresaid lever 43a has its inner end surface formed with two surfaces 49, 50 oppositely inclined to the vertical, with the upper surface 50 of lever 43b and the other lower surface 49 of lever 43b leaving a lug 51 projecting therebetween from the inner end of said surfaces 49, 50. The lug 51 has upper and lower horizontal surfaces from which lower surface of the lug 51 the fulcrum point 46b extends, and the upper inclined surface 50 is longer than the lower inclined surface 49. The next adjacent lever 43c resting on the lever 43b likewise has its inner end provided with inclined end surfaces 52, 53 and a lug 54 projecting therefrom with horizontal upper and lower surfaces, and from the lower horizontal surface of which the fulcrum point 46c extends. The upper inclined end surface 52 of this lever 43c is shorter than the lower inclined end surface 53. The uppermost lever 43d rests with its fulcrum point 46d on the lever 43c and has its lower end surface 55 inclined to the vertical over the majority of its length with a lug 56 projecting therefrom having upper and lower horizontal surfaces. In this way the four levers 43a, b, c, d, extend diagonally from the four corners of the base member 41 to the center thereof one above the other in compact interfitted relation, whereby their inclined end surfaces prevent interference one with the other.

Movable blocks 57 are provided along the length of each lever 43 and there is provided at least one block for each lever, with the blocks forming adjustable supporting points for the platform to be placed thereon. These blocks are preferably provided with indent pins which engage in holes 58 suitably provided along the length of the levers 43, whereby the blocks 57 can be moved along the levers 43 from one hole 58 to the other, thus varying the amount of force acting at the inner end of the levers 43 on the abutment member 44 and consequently on the pressure generating container 40 therebelow.

The pressure generating container 40 is made of deformable flexible material as mentioned above and is closed in an air-tight fashion and has a tube 59 extending substantially horizontally therefrom substantially along the median of the rectangular or square base. The tube 59 extends beyond the base member 41 and rises vertically adjacent a suitably graduated scale 60.

The weighing platform 42 rests on the upper surface of the movable blocks 57 which is provided on the levers 43 as mentioned above.

When an article to be weighed is positioned on the platform 42, the weight is transmitted through the blocks 57 to the four lever arms 43, the weight thus being transmitted through the movable blocks 57 to the inner ends of the levers 43 resting one upon the other and thus to the abutment member 44 and the pressure generating container 40 therebelow. The pressure thus generated in the pressure generating container 40 forces the liquid in the container into the tube 59 thus directly giving an indication of the weight of the article on the scale 60, which scale has been calibrated previously to account for the weight of the platform 42.

When each block member 57 at the same distance from the center of the platform 42 and likewise from the center of the pressure generating container 40 and with all the levers 43 being of identical length and weight, a weight placed on any part of the platform 42 will register the same height of liquid on the scale 60 as when it is placed on another part of the platform 42.

Consequently, the present invention provides a weighing machine ensuring that a weight placed in any position on the platform will give the same indication of weight on an indicating scale for each position.

Furthermore, a further advantage of the weighing machine of the present invention is that the weighing machine is simple and cheap to manufacture and with the first mentioned embodiment described in relation to FIGURES 1-8 each pressure generating container is suitably isolated from the others preventing any over-flow of liquid one to the other.

The invention is not to be confined to any strict conformity to the showings in the drawings but changes or modifications may be made therein so long as such changes or modifications mark no material departure from the spirit and scope of the appended claims.

What I do claim and desire to obtain by Letters Patent of the United States of America is:

1. A weighing machine comprising a weighing platform; a plurality of deformable pressure-generating fluid containers disposed beneath the platform; the platform resting on the containers; U-tubes partially filled with mercury; a calibrated liquid-containing vertical tube; an adjusting valve; one end of each U-tube being connected to a separate container and the other end of each U-tube being connected via said adjusting valve to said calibrated liquid-containing vertical tube; the adjusting valve comprising a block member having a recess provided in one surface thereof; a flexible diaphragm in engagement with said one surface of the block member to form a liquid chamber therebetween; separate liquid inlet bores to the chamber provided within the block member and in communication each with a separate one of said other ends of the U-tubes; a single liquid outlet bore from the chamber within the block member and in communication with the calibrated vertical tube whereby flexing adjustment of the flexible diaphragm into and out of the chamber varies the volume of the liquid chamber to adjust to zero the height of the liquid in the calibrated vertical tube, the weight of an article or articles placed on the platform exerting pressure on the fluid in the pressure generating fluid containers such that the mercury in the U-tubes is displaced, with the total displacement of the mercury being indicated on the calibrated vertical tube as a rise above zero of the liquid therein, denoting the weight of the article or articles on the platform.

2. A weighing machine comprising a platform in the form of a parallelogram; a base member; four deformable pressure-generating fluid containers positioned upon the base member; the base member and platform being substantially in parallel relationship and substantially horizontal; one of the four deformable pressure-generating fluid containers being positioned beneath each corner of the platform; the platform resting on the containers; four U-tubes partially filled with mercury; a calibrated liquid-containing vertical tube; an adjusting valve; one end of each U-tube being connected to a separate container and the other end of each U-tube being connected via said adjusting valve to said calibrated liquid-containing vertical tube; the adjusting valve comprising a block member having a recess provided in one surface thereof; a flexible diaphragm in engagement with said one surface of the block member to form a liquid chamber therebetween; four liquid inlet bores to the chamber provided within the block member and in communication each with a separate one of said other ends of the four U-tubes; a single liquid outlet bore from the chamber within the block member and in communication with the calibrated vertical tube whereby flexing adjustment of the flexible diaphragm into and out of the liquid chamber varies the volume of the liquid chamber to adjust to zero the height of the liquid in the calibrated vertical tube, the weight of an article or articles placed on the platform exerting pressure on the fluid in the pressure generating fluid containers such that the mercury in the U-tubes is displaced, with the total displacement of the mercury being indicated on the calibrated vertical tube as a rise above zero of the liquid therein, denoting the weight of the article or articles on the platform.

3. A weighing machine comprising a weighing platform; a plurality of deformable pressure-generating fluid containers disposed beneath the platform; the platform resting on the containers; U-tubes partially filled with mercury; a calibrated liquid-containing vertical tube; an adjusting valve; one end of each U-tube being connected to a separate container and the other end of each U-tube being connected via said adjusting valve to said calibrated liquid-containing vertical tube; the adjusting valve comprising a block member having a recess provided in one surface thereof; a flexible diaphragm in engagement with said one surface of the block member to form a liquid chamber therebetween; separate liquid inlet bores to the chamber provided within the block member and in communication each with a separate one of said other ends of the U-tubes; a single liquid outlet bore from the chamber within the block member and in communication with the calibrated vertical tube whereby flexing adjustment of the flexible diaphgram into and out of the chamber varies the volume of the chamber to adjust to zero the height of the liquid in the calibrated vertical tube, the weight of an article or articles placed on the platform exerting pressure on the fluid in the pressure generating fluid containers such that the mercury in the U-tubes is displaced, with the total displacement of the mercury being indicated on the calibrated vertical tube as a rise above zero of the liquid therein, denoting the weight of the article or articles on the platform, and flexing adjustment of the flexible diaphragm into the liquid chamber to contact and close-off the mouths of the inlet bores into the liquid chamber, preventing substantial movement of the fluid on the inlet side of the liquid chamber, such that the fluid is held in a substantially rigid state.

4. A weighing machine comprising a weighing platform; a plurality of deformable pressure-generating fluid containers disposed beneath the platform; the platform resting on the containers; U-tubes partially filled with mercury; a calibrated liquid-containing vertical tube; an adjusting valve; one end of each U-tube being connected to a separate container and the other end of each U-tube being connected via said adjusting valve to said calibrated liquid-containing vertical tube; the adjusting valve comprising a block member having an annular depression provided in one surface thereof; a circular depression lying concentrically within the annular depression; the circular depression being of lesser depth than the annular depression; a flexible diaphragm having its inner surface engaging with said one surface of the block to form a liquid chamber therebetween; separate liquid inlet bores to the chamber provided in the block member and entering into the circular depression, the inlet bores being in communication each with a separate one of said other ends of the U-tubes; a single liquid outlet bore from the chamber provided in the block member leaving the chamber at the annular depression; said outlet bore being in communication with the calibrated vertical tube whereby flexing adjustment of the flexible diaphragm into and out of the liquid chamber varies the volume of the chamber to adjust to zero the height of the liquid in the calibrated tube, the weight from the article or articles placed on the platform exerting pressure on the fluid in the pressure generating fluid containers such that the mercury in the U-tubes is displaced, with the total displacement of the mercury being indicated on the calibrated vertical tube as a rise above zero of the liquid therein, denoting the weight of the article or articles on the platform and inward flexing of the flexible diaphragm into the circular depression closing off the mouths of the inlet bores into the liquid chamber preventing substantial movement of the fluid on the inlet side of the chamber such that it is held in a substantially rigid state.

5. The weighing machine as claimed in claim 4 which includes a bleed bore in the block member between the liquid chamber and atmosphere; and a bleed screw in said bleed bore whereby bleeding-off of liquid into the chamber via the bleed bore may be effected upon suitable adjustment of the bleed screw.

6. The weighing machine as claimed in claim 4, which includes an apertured plate fixed relative to said one surface of the block member; the flexible diaphragm being positioned between said apertured plate and said one surface of the block member, a screw threaded into the apertured plate such that its one end engages the outer surface of the flexible diaphragm; the rotation of the screw in the apertured plate to move the screw toward said one surface of the block member causing flexing of the flexible diaphragm into the liquid chamber and rotation of the screw in the opposite direction allowing return movement of the flexible diaphragm from out of the liquid chamber, thus varying the volume of said liquid chamber.

7. A weighing machine comprising a weighing platform; a plurality of deformable pressure-generating fluid containers disposed beneath the platform; the platform resting on the containers; an adjusting valve comprising a housing having first and second opposed surfaces; a substantially horizontally disposed first diaphragm member dividing said housing into first and second compartments; the first compartment being formed between said first surface of the housing and the said first diaphragm; the second compartment being formed between said second surface of the housing and said first diaphragm; a pressure plate in the first compartment resting in contact with the first diaphragm; liquid provided in the second compartment; a calibrated liquid-containing manometer tube; said second compartment being in communication with said calibrated liquid containing manometer tube; a plurality of closed chambers provided in the pressure plate each having one surface thereof formed by a separate second diaphragm; connecting tubes communicating each pressure generating fluid container with at least one of said closed chambers; a plurality of plates fixed to said first surface of the housing, each of said plates being arranged to rest in contact with a separate one of said second diaphragms; the weight of an article or articles positioned on said platform generating pressure in the pressure generating containers which is transmitted to the second diaphragms via said connecting tubes and from said second diaphragms to said second compartment via said plates, the first surface of the housing the pressure plate and the first diaphragm, with the weight of the article or articles being indicated on the calibrated manometer tube.

8. A weighing machine comprising a platform in the form of a parallelogram; a base member; four deformable pressure-generating fluid containers positioned upon the base member; the base member and platform being substantially in parallel relationship and substantially horizontal; one of the four deformable containers being positioned beneath each corner of the platform; the platform resting on the containers; an adjusting valve comprising a housing having first and second opposed surfaces; a substantially horizontally disposed first diaphragm dividing said housing into first and second compartments; the first compartment being formed between said first surface of the housing and said first diaphragm; the second compartment being formed between said second surface of the housing and said first diaphragm; a pressure plate resting in contact with said first diaphragm in the first compartment; liquid provided in the second compartment; a calibrated liquid-containing manometer tube; said second compartment being in communication with said calibrated liquid containing manometer tube; eight closed chambers provided in the pressure plates; eight second diaphragms each forming one surface of a separate one of said eight closed chambers; eight plates fixed to said first surface of the housing within said first compartment; each of said plates resting in contact with a separate one of said eight second diaphragms; said eight chambers being connected in pairs and four connecting tubes connecting each pair of closed chambers to a separate one of the four pressure generating fluid containers whereby pressure generated in the pressure-generating fluid containers by an article or articles positioned on said platform is transmitted to the eight closed chambers within the pressure plate and thence to said second compartment of the housing via the eight plates, the first surface of the housing, the pressure plate and said first diaphragm, with the weight of the article or articles being indicated on the calibrated manometer tube.

References Cited

UNITED STATES PATENTS

| 1,147,128 | 7/1915 | Troll | 177—208 X |
| 2,052,116 | 8/1936 | Strauss | 177—209 |
| 2,352,934 | 7/1944 | Bohannan | 177—208 X |
| 2,472,689 | 6/1949 | Adams et al. | 177—209 X |
| 2,577,100 | 12/1951 | Alvarez | 177—208 |
| 2,668,702 | 2/1954 | Belknap | 177—208 |
| 2,835,484 | 5/1958 | Bradley | 177—209 |

FOREIGN PATENTS

| 218,558 | 4/1957 | Australia. |
| 1,038,410 | 8/1966 | Great Britain. |
| 530,180 | 6/1955 | Italy. |

RICHARD B. WILKINSON, *Primary Examiner.*

G. H. MILLER, JR., *Assistant Examiner.*